United States Patent [19]
Young et al.

[11] Patent Number: 5,811,003
[45] Date of Patent: Sep. 22, 1998

[54] APPARATUS FOR ENGAGING A SEPARATOR SCREEN TO A SHAKER DEVICE

[75] Inventors: Grant Young; Richard Gifford, both of Tulsa, Okla.

[73] Assignee: Phoenix Energy Products, Inc., Houston, Tex.

[21] Appl. No.: 746,709

[22] Filed: Nov. 15, 1996

[51] Int. Cl.$^6$ .............................. B01D 33/00; B07B 1/46
[52] U.S. Cl. .......................... 210/388; 209/399; 209/403; 209/405
[58] Field of Search .................................. 210/388, 389; 209/403, 399, 405, 411, 412

[56] References Cited

U.S. PATENT DOCUMENTS

| | | |
|---|---|---|
| 918,261 | 4/1909 | Bayley . |
| 3,795,311 | 3/1974 | Martin . |
| 4,402,826 | 9/1983 | Uchitel . |
| 4,519,902 | 5/1985 | Kinder . |
| 4,840,728 | 6/1989 | Connolly . |
| 5,006,228 | 4/1991 | Anderson . |
| 5,361,911 | 11/1994 | Waites . |
| 5,377,846 | 1/1995 | Askew . |

FOREIGN PATENT DOCUMENTS 957193 5/1964 United Kingdom .

*Primary Examiner*—Thomas M. Lithgow
*Attorney, Agent, or Firm*—Marshall, O'Toole, Gerstein, Murray & Borun

[57] ABSTRACT

A separator screen installation system for a shaker separator device, including an improved wedge block and vertical screen rail which provide rapid and secure screen installation and reduced accumulation of solids on the upstream end of the wedge blocks.

4 Claims, 4 Drawing Sheets

APPARATUS FOR ENGAGING A SEPARATOR SCREEN TO A SHAKER DEVICE

BACKGROUND AND FIELD OF THE INVENTION

This invention relates generally to shaker devices that use screens and vibratory motion to separate solids from liquids, and particularly to an improved wedge block and screen rail system for securing shaker screens to shaker devices.

Shaker devices as contemplated by this invention include but are not limited to shale shakers used in conjunction with well drilling equipment. In drilling a well, drilling mud is circulated through the drill pipe to the drill bit and back to the surface. This drilling mud flushes out stone fragments from the drilling process. It is desirable to recycle drilling mud because it is expensive, so before returning it to the well, the mud is processed with a "shale shaker" to screen out much of the solids that become suspended in the mud.

Shale shakers include a lower stationary frame and an upper basket that is mounted on the frame via a suspension system. The basket is vibrated by one or more vibratory motors. Inside the basket there are one or more shaker screens used to retain solids while permitting mud to drain down and out of the basket. Due to the vibration of the motor, the solids are conveyed downstream on the separator screen until they are dumped off of the screen and onto another screen for further separation or off of the shale shaker for disposal elsewhere.

Shaker separator screens must be changed periodically, but downtime on a drilling rig is expensive, so it is preferred to change screens when other maintenance work is being performed. Even then downtime is short, and changes must often be done quickly with dependable results.

Wedge blocks are typically used to secure separator screens to baskets. Once the screen is installed on rails in the basket, wedge blocks are inserted along the top edges of the screen and under wedge angles that are typically welded to the inside of the basket at an angle that matches the shape of the wedge. The wedge is then hammered into engagement with the wedge angle to apply a downward force to the screen and hold it in place.

It is preferred to wedge the screen on both sides so that a seal is effected between the screen support and the frame of the screen such that unscreened mud cannot flow down past the screen for recycling. Further, the high ends of the wedges should preferably be directed upstream so they can not be dislodged by screen vibrations and the flow of mud and solids. When this is done, the wedges at the upstream end of the screen are very near the back wall of the basket and there is little room in which to swing a hammer toward the wedge. When it is difficult to install the wedges, screen installation takes more time and is less accurate.

Further, shaker screen performance and replacement time can be affected by how well solids are conveyed from the upstream end of the screen to the downstream end of the screen. When traditional wedge blocks are used to secure separator screens to the basket they tend to interfere with solids conveyance during heavy solids loading such that solids can get trapped on the upstream end of the wedge block. Accumulations of solids on the screen slows down the change over from old screens to new and will cause screens to wear out more rapidly.

Thus, it is desirable to have a separator screen installation system that includes an improved wedge block that secures the screen near its corners, reduces the accumulation of solids along its upstream end, and ensures quick and effective installation.

SUMMARY OF THE INVENTION

Separator screen installation in accordance with the present invention is easier to accomplish, improves speed and reliability of installation, and reduces the build up of solids along the upstream end of wedge blocks used to secure the screens to the basket. Such a screen installation system includes a wedge block having an upper side with a high end and a low end, the upper side is adapted to engage a shaker device wedge angle between the high end and the low end, and a lower side for engaging a separator screen; and a hammering arm extending upward from the wedge block's low end. The hammering arm is thus spaced further apart from the basket feed end wall to provide critical space in which to swing a hammer and securely install the wedge.

The system may also, but does not necessarily, include a vertical rail positioned between the wedge block and the screen, which preferably runs the length of the screen so that the wedge block is at a higher position and solids can not accumulate on the upstream side of the wedge block. The vertical rail may be temporarily or permanently attached to the screen or it may be separate from the screen.

A method for installing a screen with such a system is also contemplated in this invention. Such a method includes the steps of installing a pretensioned screen in a basket; placing a wedge block on the screen and under a wedge angle that is attached to the basket; and hammering a hammer arm extending upward from a low end of the wedge to secure the screen to the basket.

The invention also enhances shaker performance when it includes a screen mounted on a frame or perforated plate separator screen having an upstream end, a downstream end, and first and second side edges extending between the upstream end and the downstream end, and a first upwardly extending vertical side rail bearing on the first edge; and a second upwardly extending vertical side rail bearing on the second edge. The side rails may be fixed to the separator screen.

The pretensioned separator screen side rails may be adapted to engage a wedge block having an upper side with a high end and a low end, and a lower side for engaging the vertical rail; and a hammering arm extending upward from the wedge block low end.

DETAILED DESCRIPTION OF THE DRAWINGS

Figure 1:
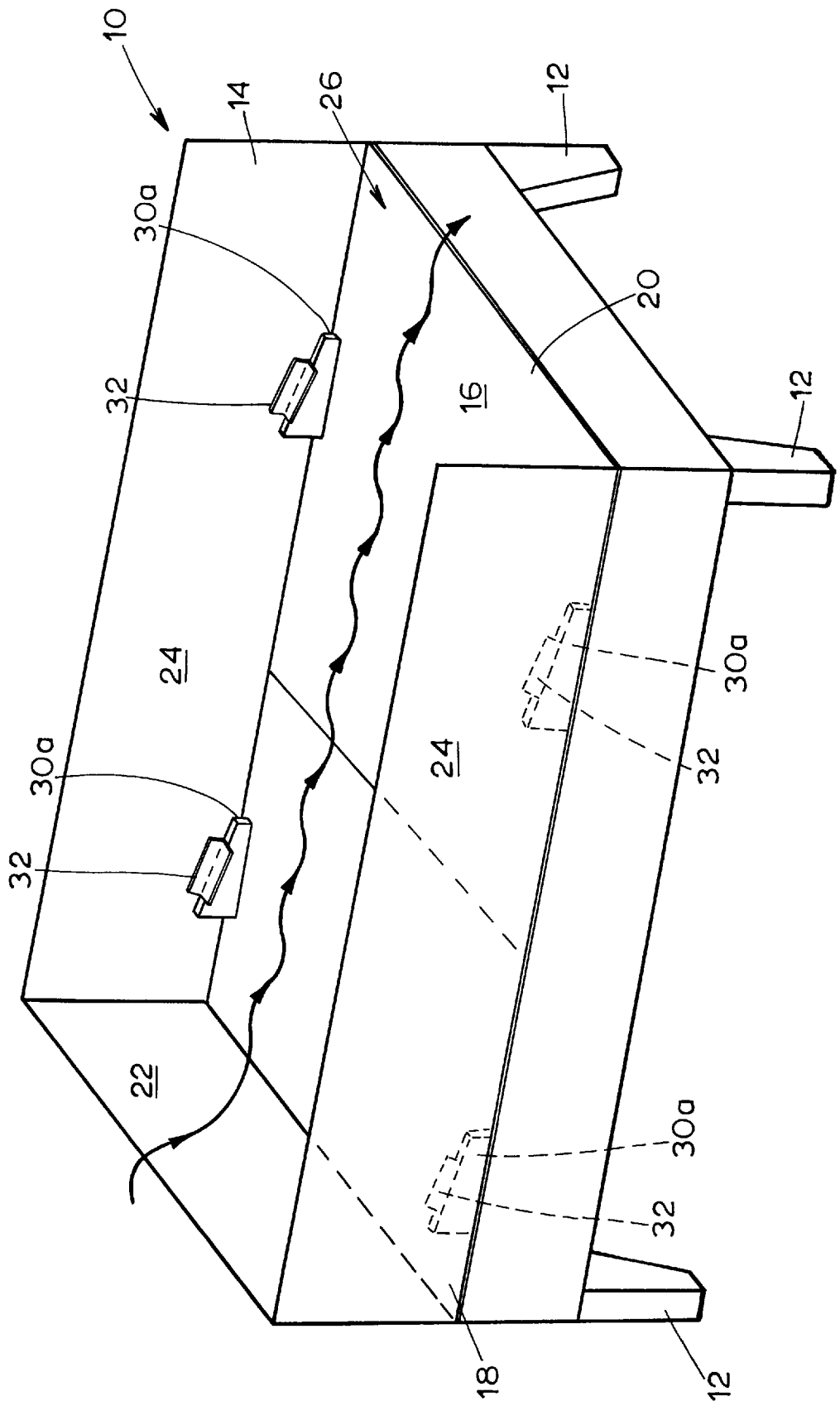
FIG. 1 is a perspective view of a prior art separator screen installation system.
Figure 2:
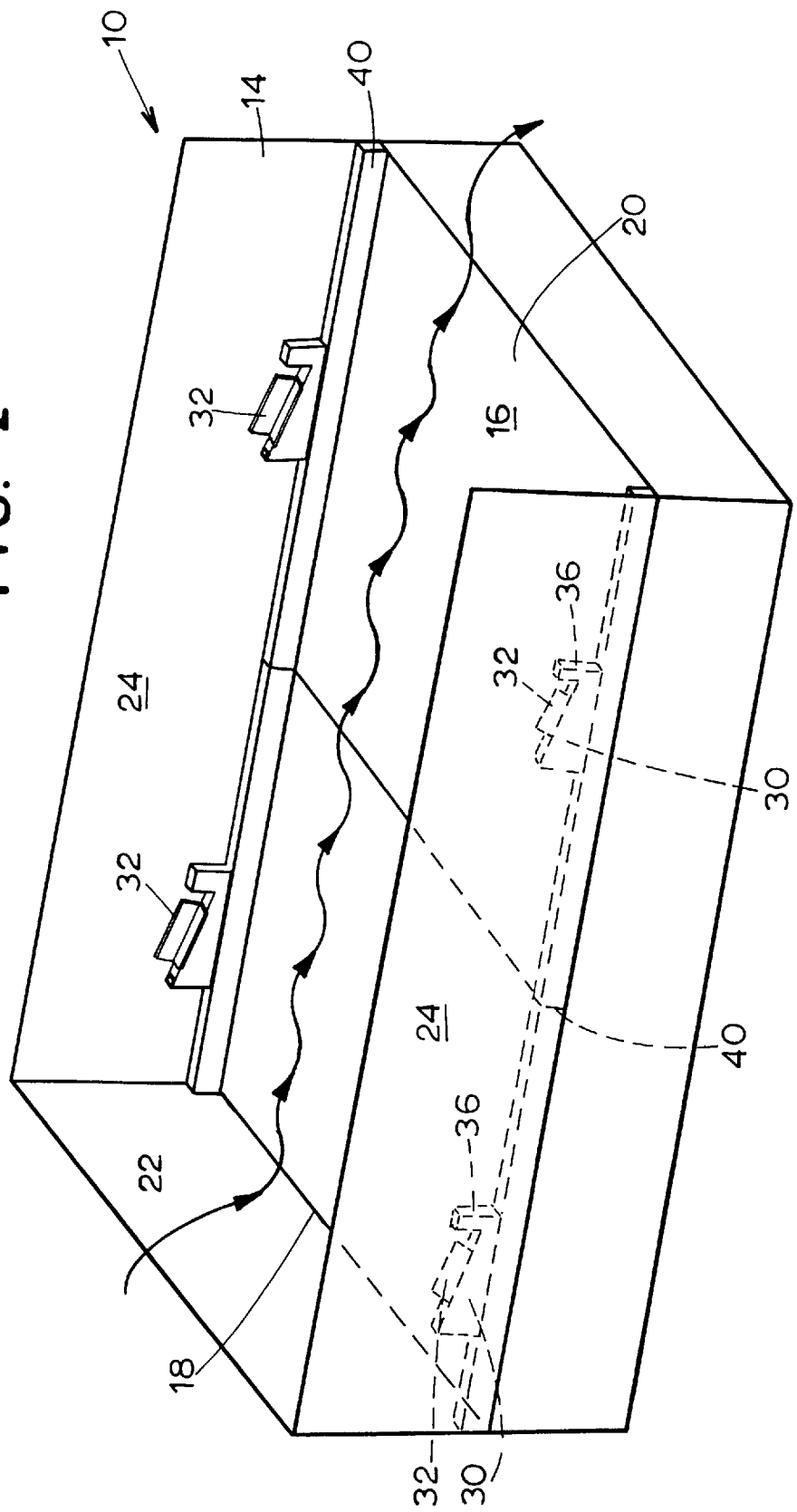
FIG. 2 is a perspective view of a separator screen installation system in accordance with the present invention.

To the extent reasonable and practical, the same reference numerals will be used in each of the drawings referred to herein. Referring to FIG. 1, there is depicted a shaker apparatus 10 which includes a lower frame 12 and an upper basket 14. The shaker apparatus 10 can have a variety of shapes and configurations, but generally it is intended to receive solids-laden mud from a distribution box (not illustrated) into the basket 14 which is vibrated by a motor (not illustrated) relative to the frame 12. The basket 14 includes an upstream end 18, a downstream end 20, and a back wall 22 at the upstream end 18, two side walls 24. The downstream end 20 is open. In operation, drilling mud with suspended solids is poured into the basket 14 over the back wall 22 and onto the screen 16. Once on the screen, the solids-laden mud is vibrated toward the downstream end 20 which causes the mud to pass downward through the screen into a collection box (not illustrated) and out of the shaker apparatus 10 for further processing. The solids continue to be conveyed downstream on the screen 16 toward the open end 26 where they are either dropped onto another screen for further separation or discarded.

Figure 3:
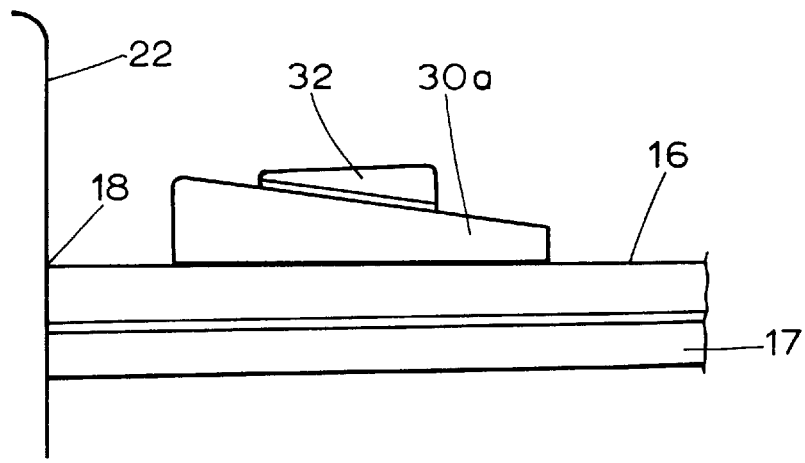
FIG. 3 is a side elevation view of the screen installation system.
Figure 4:
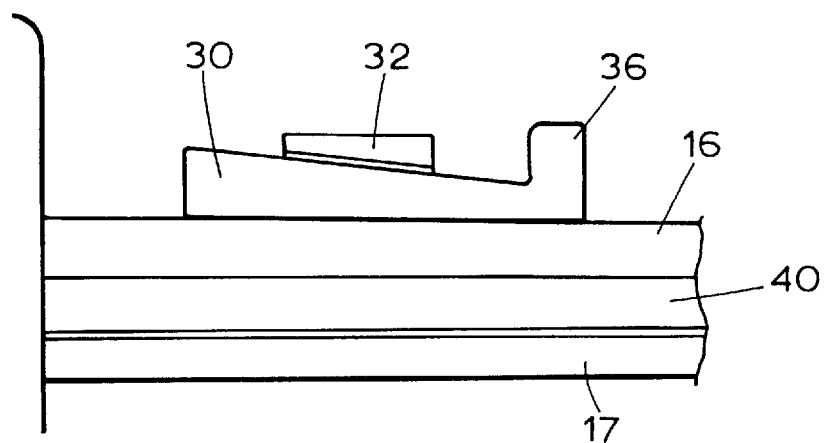
FIG. 4 is a side elevational view of an improved wedge block and screen rail in accordance with the present invention.

The screen 16 is preferably a pretensioned screen so that the vibration is effectively transferred to the solids slurry and the solids are conveyed steadily downstream. Other frame-mounted screens will work with the invention, as well, including those secured to perforated plates. Such screens, and particularly, pretensioned screens, are typically provided with side rails that rest on support rails 17 in FIGS. 3 and 4 that are welded to the inside of the basket 14. It is preferable to have as much of the screen surface open for screening purposes as possible so the width of the rails is kept to a minimum. In the illustrated embodiment, there is a front discharge screen and a back feed screen, but they will be referred to herein as a single screen 16 for simplicity. It is also possible to have any number of screens depending on the shaker design and their placement within the basket. The invention operates equally well regardless of the number of screens or their position in the basket 14.

In prior art shaker apparatus 10 designs, the pretensioned screen was mounted in the basket 14 with wedges 30a that were hammered into place under wedge angles 32 which were welded to the inside of the basket 14 at an angle that matched the angle of the wedge 30a. In this manner, the screens 16 were installed by placing a pretensioned screen 16 onto support rails 17 in the basket 14. Once in place a wedge 30a would be placed on top of the pretensioned screen 16 under a wedge angle 32 and then hammered into engagement with the wedge angle 32 to apply a downward force on the screen 16 to maintain it against the support rail 17 in the basket 14. Because of the size of the wedges and the need for the wedge block to cover as much of the screen edge as possible there is only a small space between the backwall in which to swing a hammer. Consequently, wedges 30a that are closest to the back wall 22 or any other obstruction in a basket 14 are the most difficult to install and at times may even be installed improperly resulting in poor shaker apparatus 10 performance or even requiring a shutdown to reengage the wedge 30a appropriately.

Further, because the wedges 30a were placed directly on top of the pretensioned screen 16, there was a tendency during heavy solids loading for solids to be held up on the upstream end of the wedges 30a. As solids are held up on the upstream sides of the wedges 30a, other solids would also become entangled which blocked a portion of the screen 16 surface, thus making the screen 16 less efficient. Furthermore, a buildup of solids on the screen often causes premature screen failure.

As seen in FIGS. 2 to 5 with the present invention, the above deficiencies with the prior art system are avoided. First, wedges 30 are provided with an upwardly extending hammer arm 36 on which a hammering force can be applied to engage the wedge 30 with a wedge angle 32. The hammer arm 36 extends upward from the low end of the wedge 30 and provides as much as an additional 10" of hammer swinging space between the back wall 22 and the hammer arm 36 so that engagement of a wedge 30 with a wedge angle 32 is assured. The wedge 30 can also be fully tapered down (FIG. 5) from its downstream end to its upstream end or tapered part of the way to reduce the possibility of solids collecting on its upstream side.

In addition to improving engagement of the wedge 30 with the screen 16 and wedge angle 32, an upwardly extending vertical rail 40 is positioned between the wedges 30 and the screen 16. The vertical rail 40 preferably extends from the back wall 22 of the basket 14 to the open end 26 of the basket. In this manner, solids that are separated on the screen 16 are unable to collect on the upstream side of the wedges 30 and they remain in a conveyance path with the remainder of the materials on the screen 16. Thus, there will be less of an accumulation of solids along the sides of the screen 16 and the screen will become more efficient and have a longer useful life. Fewer solids on the screen 16 also reduces the weight of the basket which results in more efficient shaker operation.

Figure 5:
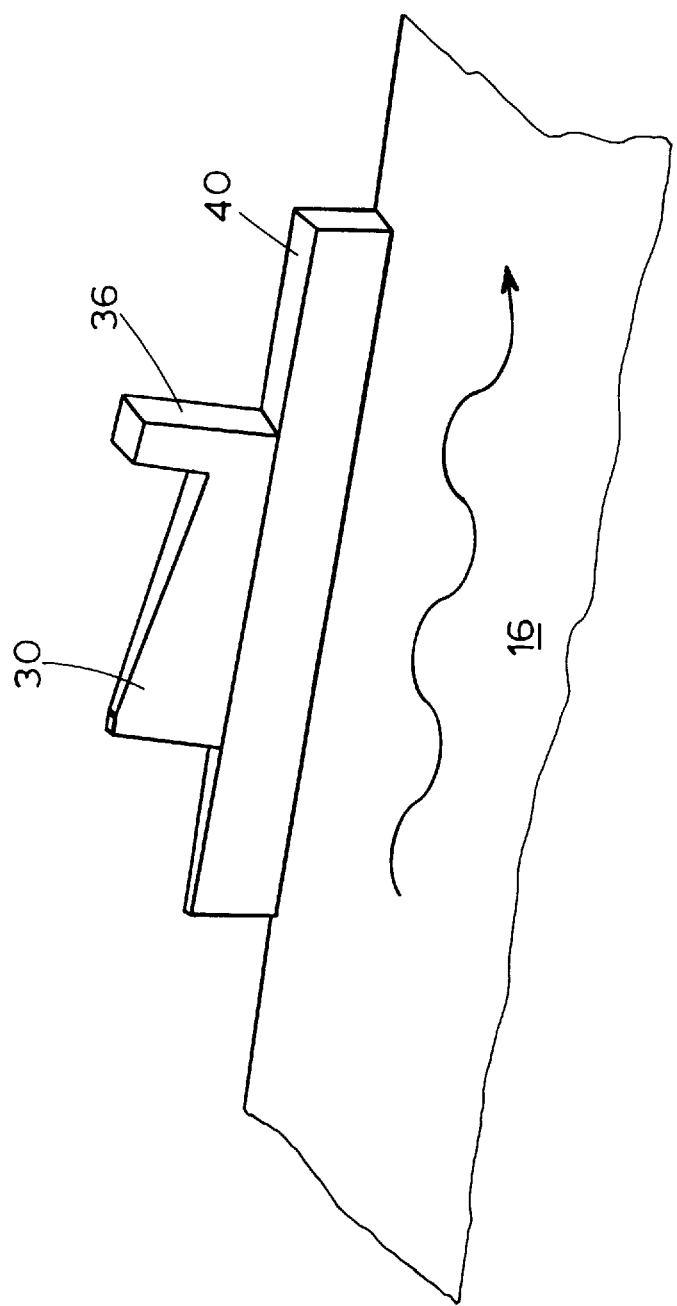
FIG. 5 is a perspective view of a tapered wedge block and a tapered vertical side rail in accordance with the present invention.

The vertical rail 40 is preferably formed integrally with the pretensioned screens 16 so that when a screen is installed the vertical rail 40 is already in place. However, the vertical rail 40 may be a separate item that is inserted on top of the screen 16 prior to engaging the wedges 30 with the wedge angles 32 as described above. Further, the rail 40 need not extend the entire length of the screen 16, particularly if it is partially or fully tapered down from its downstream side (right side) to its upstream side (left side) as depicted in FIG. 5.

The system is best applied when both the improved wedge block 30 and the vertical rail 40 are used in combination. Nonetheless, the wedge block 30 can be used without the vertical rail 40 and the vertical rail 40 can be used without the improved wedge block 30 because either improvement will enhance shaker performance.

The foregoing is provided for clearness of understanding only and no unnecessary limitations therefrom should be read into the following claims.

We claim:

1. An apparatus comprising:
  (a) a frame:
  (b) a separator screen mounted on the frame, the separator screen having an upstream end, a downstream end, and first and second side edges extending between the upstream end and the downstream end;
  (c) a first upwardly extending vertical side rail bearing on the first edge;
  (d) a second upwardly extending vertical side rail bearing on the second edge; and
  (e) first and second wedge blocks, the first vertical side rail engaging the first wedge block and the second vertical side rail engaging the second wedge block, each wedge block having an upper side with a high end and a low end, and a lower side for engaging one of the vertical side rails, each wedge block comprising a hammering arm extending upwardly from the wedge block low end.

2. The apparatus of claim 1 in which the side rails are fixed to the separator screen.

3. The apparatus of claim 1 in which the side rails each have an upstream end and a downstream end and is tapered down from the downstream end to the upstream end.

4. The apparatus of claim 1 wherein the wedge block has an upstream end and a downstream end and is tapered down in thickness from the downstream end to the upstream end.

* * * * *